US011822808B2

(12) United States Patent
Yoder et al.

(10) Patent No.: US 11,822,808 B2
(45) Date of Patent: Nov. 21, 2023

(54) REMOTELY REPLICATING DUPLICATED DATA

(71) Applicant: EMC IP Holding Company LLC, Hopkinton, MA (US)

(72) Inventors: Benjamin Yoder, Chandler, AZ (US); William R. Stronge, Westford, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/984,536

(22) Filed: Nov. 10, 2022

(65) Prior Publication Data
US 2023/0079007 A1 Mar. 16, 2023

Related U.S. Application Data

(63) Continuation of application No. 16/885,587, filed on May 28, 2020, now Pat. No. 11,526,292.

(51) Int. Cl.
G06F 3/06 (2006.01)
(52) U.S. Cl.
CPC ............ G06F 3/065 (2013.01); G06F 3/067 (2013.01); G06F 3/0617 (2013.01); G06F 3/0641 (2013.01); G06F 3/0659 (2013.01); G06F 3/0665 (2013.01); G06F 3/0683 (2013.01)

(58) Field of Classification Search
CPC ...... G06F 3/065; G06F 3/0617; G06F 3/0641; G06F 3/0659; G06F 3/0665; G06F 3/067; G06F 3/0683
See application file for complete search history.

(56) References Cited

U.S. PATENT DOCUMENTS

| 8,620,886 B1* | 12/2013 | Madan ................ H04L 67/5682 707/697 |
| 2012/0150826 A1* | 6/2012 | Vijayan Retnamma ..................... G06F 16/174 707/E17.007 |
| 2015/0331756 A1* | 11/2015 | Chennamsetty .... G06F 11/1453 707/649 |
| 2020/0159454 A1* | 5/2020 | Takaoka ................ G06F 3/0689 |

* cited by examiner

Primary Examiner — Eric Cardwell
(74) Attorney, Agent, or Firm — Muirhead and Saturnelli, LLC

(57) ABSTRACT

Data may be replicated from a host storage system to a target storage system. It may be determined to replicate a first logical storage element on the source storage system to a second logical storage element on the target storage system, wherein the first logical storage element defines a first data portion having a first value. It may be determined that a third logical storage element on the target storage system defines a second data portion having the first value. The first logical storage element may be replicated to the second logical storage element by establishing a deduplication relationship between the second logical storage element and the third logical storage element on the target storage system without transmitting the first data portion from the source storage system to the target storage system.

16 Claims, 8 Drawing Sheets

| 300 | 304 LSU | 306 LSU Track | 312 Cache Pointer |
|---|---|---|---|
| | 1 | 0 | 77 |
| | 1 | 1 | 14 |
| | 1 | 2 | 227 |
| 302 | 1 | 3 | 922 |
| | 1 | 4 | 3 |
| | 1 | 5 | 432 |
| | 1 | 6 | 45 |
| | 1 | 7 | 577 |
| | 1 | 8 | 61 |
| | 1 | 9 | 199 |
| | 2 | 0 | 65 |
| | 2 | 1 | 35 |
| | 2 | 2 | 1 |

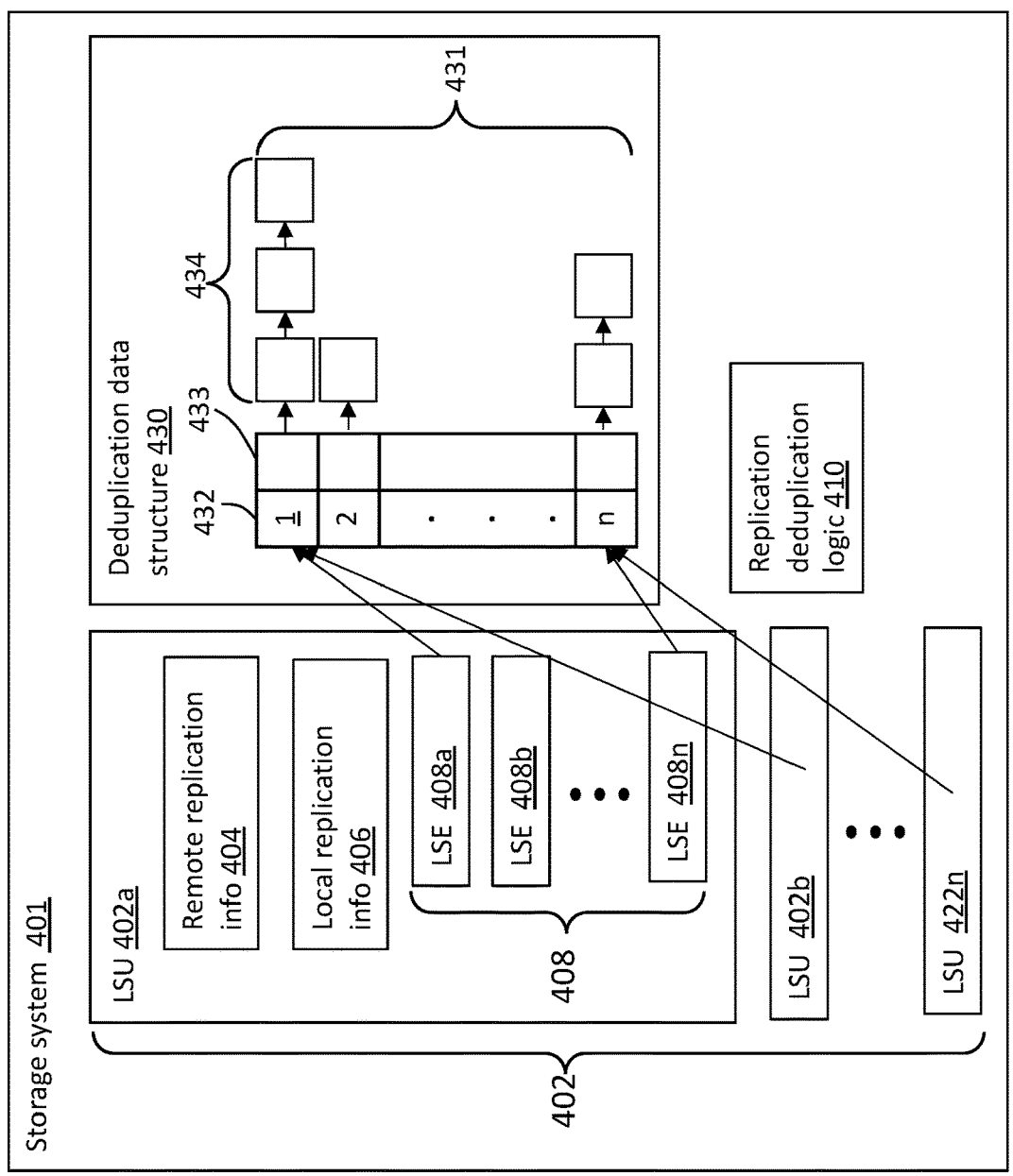

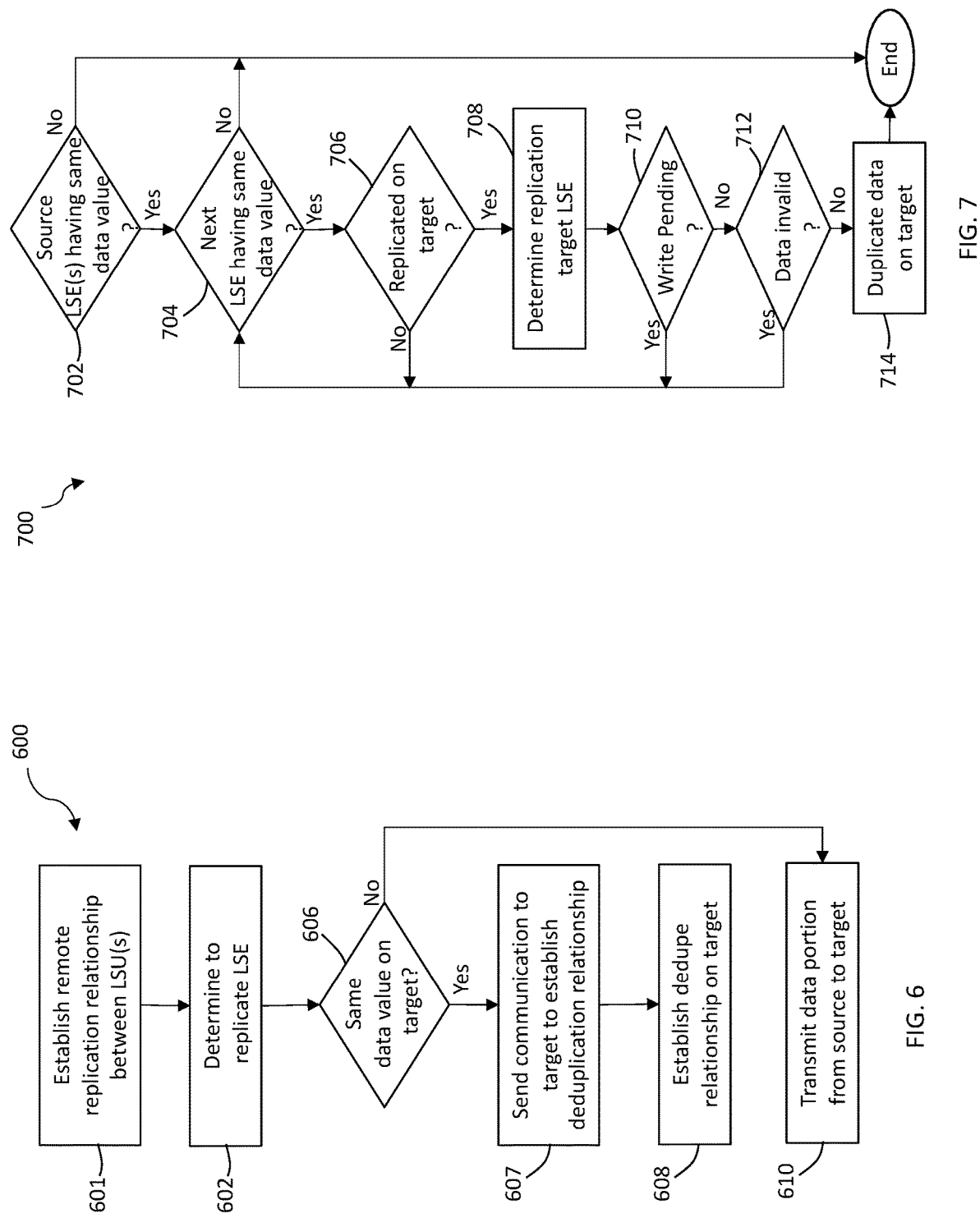

REMOTELY REPLICATING DUPLICATED DATA

BACKGROUND

Technical Field

This application generally relates to data storage systems, and more particularly to replicating duplicated data on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (TO) operations utilizing a physical storage device of the storage system, one or more components of the host system, storage system and network components therebetween may be used.

Host systems may not address the physical storage devices of a storage systems directly, but rather access to data may be provided to one or more host systems from what the host systems view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

To improve availability of data on a data storage network, remote data replication may be employed to store the data on multiple storage systems of the storage network, where such storage systems may be located in different rooms, floors, buildings or sites. Remote replication refers to replication of data to a different storage system (e.g., storage array), as distinguished from local replication, which refers to replication of data to another location on a same storage system. For example, a remote replication relationship may be established between a source LSU on a first storage system and a target LSU on a second storage system, as a result of which data for the source LSU may be replicated to the target storage system. For example, each time data is written to a sub-element (e.g., track) of the LSU (e.g., as part of a write operation or copy operation specified by a host system), the first storage system may send a copy of the data to a corresponding sub-element of the target LSU on the second storage system. A sub-element of an LSU may be referred to herein as a logical storage element (LSE). Remote data replication may be implemented using any of a variety of technologies including, for example, Symmetric Remote Data Facility (SRDF™) made available from made available from Dell EMC.

Data deduplication or "dedupe" reduces the amount of data stored in a data storage system by determining identical (or presumably identical) portions of data stored, or intended to be stored, in the data storage system, and only storing a single instance of the data portion to a physical storage device on the storage system. Thus, for multiple LSEs defining data portions having a same value on a storage system, only a single instance of the data portion may be stored to a physical storage device of the storage system, and each LSE may reference (e.g., point to), directly, or indirectly, the single instance of the data portion.

SUMMARY OF THE INVENTION

In an embodiment of the invention. A method of replicating data from a host storage system to a target storage system is performed. The method includes determining to replicate a first logical storage element on the source storage system to a second logical storage element on the target storage system, wherein the first logical storage element defines a first data portion having a first value, determining that a third logical storage element on the target storage system defines a second data portion having the first value, and replicating the first logical storage element to the second logical storage element by establishing a deduplication relationship between the second logical storage element and the third logical storage element on the target storage system without transmitting the first data portion from the source storage system to the target storage system. The method further may include sending a communication to the target storage system that specifies to the target storage system to establish the deduplication relationship between the second logical storage element and the third logical storage element, where the deduplication relationship is established in response to the communication. The method further may include sending a communication to the target storage system that specifies that the target storage system copy the third logical storage element to the second logical storage element, where the deduplication relationship is established in response to the communication. Establishing the deduplication relationship may include, in response to receiving the communication, executing a copy command on the third logical storage element in accordance with a SCSI protocol, where the target system is configured to establish deduplication relationships in response to executing the copy command. Establishing a deduplication relationship may result in the second logical storage element including a pointer to a physical storage location or metadata structure corresponding to the second logical storage element. Determining that the third logical storage element on the target storage system defines second data portion having the first value may include determining that a fourth logical storage element on the source storage system defines the second data portion having the first value, and determining that the fourth logical element is configured for replication to the third logical storage element. Determining that a fourth logical storage element on the source storage system defines the second data portion having the first value may include determining a deduplication relationship between the first logical storage element and the fourth logical storage element. A replication relationship may be defined between a first logical storage unit on the source storage system that includes the first logical storage element and a second logical storage unit on the target storage system that includes the second logical storage element, and the determination to replicate in accordance with the replication relationship may be made in response to receiving a copy instruction that causes copying the fourth logical storage element to the first logical storage element and the establishing of the deduplication relationship between the fourth logical storage element and the first logical storage element. A replication relationship may be defined between a first logical storage unit on the source storage system that includes the first logical storage element and a second logical storage unit on the target storage system that includes the second logical storage element, the determination to replicate in accordance with the replication relationship may be made in response to receiving a write operation specifying the first logical storage element and the first data portion, and establishing the deduplication relationship between the fourth logical storage element and the first logical storage element may include determining that the first data portion and the second data portion defined by the fourth logical storage element have the same value. The fourth logical storage element may be a member of a first logical storage unit on the source target system, and the third logical storage element may be a member of a second logical storage unit on the target system, and determining that the fourth logical element is configured for replication to the third logical storage element may include determining a replication relationship between the first logical storage unit and the second logical storage unit.

In another embodiment of the invention, a system for replicating data is provided. The system may include a source storage system including a first logical storage element, a target storage system including a second logical storage element, and executable logic that implements a method. The method includes determining to replicate the first logical storage element from the source storage system to the second logical storage element on the target storage system, wherein the first logical storage element defines a first data portion having a first value, determining that a third logical storage element on the target storage system defines a second data portion having the first value, and replicating the first logical storage element to the second logical storage element by establishing a deduplication relationship between the second logical storage element and the third logical storage element on the target storage system without transmitting the first data portion from the source storage system to the target storage system. The method further may include sending a communication to the target storage system that specifies to the target storage system to establish the deduplication relationship between the second logical storage element and the third logical storage element, where the deduplication relationship may be established in response to the communication. The method further may include sending a communication to the target storage system that specifies that the target storage system copy the third logical storage element to the second logical storage element, where the deduplication relationship may be established in response to the communication. Establishing the deduplication relationship may include, in response to receiving the communication, executing a copy command on the third logical storage element in accordance with a SCSI protocol, where the target system may be configured to establish deduplication relationships in response to executing the copy command. Determining that the third logical storage element on the target storage system defines second data portion having the first value may include determining that a fourth logical storage element on the source storage system defines the second data portion having the first value, and determining that the fourth logical element is configured for replication to the third logical storage element. Determining that a fourth logical storage element on the source storage system defines the second data portion having the first value may include determining a deduplication relationship between the first logical storage element and the fourth logical storage element. A replication relationship may be defined between a first logical storage unit on the source storage system that includes the first logical storage element and a second logical storage unit on the target storage system that includes the second logical storage element, and the determination to replicate in accordance with the replication relationship may be made in response to receiving a copy instruction that causes copying the fourth logical storage element to the first logical storage element and the establishing of the deduplication relationship between the fourth logical storage element and the first logical storage element. A replication relationship may be defined between a first logical storage unit on the source storage system that includes the first logical storage element and a second logical storage unit on the target storage system that includes the second logical storage element, the determination to replicate in accordance with the replication relationship may be made in response to receiving a write operation specifying the first logical storage element and the first data portion, and establishing the deduplication relationship between the fourth logical storage element and the first logical storage element may include determining that the first data portion and the second data portion defined by the fourth logical storage element have the same value. The fourth logical storage element may be a member of a first logical storage unit on the source target system, and the third logical storage element may be a member of a second logical storage unit on the target system, and determining that the fourth logical element is configured for replication to the third logical storage element may include determining a replication relationship between the first logical storage unit and the second logical storage unit.

In another embodiment of the invention, computer-readable media may be provided having software stored thereon defining a method of replicating data. The software includes executable code that determines to replicate a first logical storage element on the host storage system to a second logical storage element on the target storage system, wherein the first logical storage element defines a first data portion having a first value, executable code that determines that a third logical storage element on the target storage system defines a second data portion having the first value, and executable code that replicates the first logical storage element to the second logical storage element by establishing a deduplication relationship between the second logical storage element and the third logical storage element on the target storage system without transmitting the first data portion from the source storage system to the target storage system. The software may include executable code defining any of the steps of the method described above, or portions thereof.

BRIEF DESCRIPTION OF THE DRAWINGS

Features and advantages of the present invention will become more apparent from the following detailed description of illustrative embodiments thereof taken in conjunction with the accompanying drawings in which:

FIG. 4 is a block diagram illustrating a system for replicating duplicated data, according to embodiments of the invention;

FIG. 5 is a block diagram illustrating a logical storage element for replicating duplicated data, according to embodiments of the invention;

FIG. 6 is a flowchart illustrating a method of replicating duplicated data, according to embodiments of the invention;

FIG. 7 is a flowchart illustrating a method of determining whether an LSE on a target storage system has a same data value as an LSE on a source storage system, according to embodiments of the invention.

DETAILED DESCRIPTION OF EMBODIMENTS

For an LSE that is being remotely replicated to a target storage system, a data portion having the same value as the data portion defined by the LSU may already be stored on the target storage system. In such a case, it may be desirable to avoid sending a copy of the data portion from the source system to the target system to fulfill replication of the data portion, but rather it may be desirable to make use of the data portion having the same value that already resides on the target system.

Described herein are methods and techniques that, for an LSE on a source storage system to be replicated to a target storage system for which a data portion having the same value as the value of the LSE data portion is already stored on the target storage system, replication of the LSE is achieved without sending a copy of the data portion to the target storage system. A deduplication relationship may be established on the target storage system to avoid sending a copy of the LSE data portion to the target system. By not sending a copy of the LSE data portion from the source storage system to the target storage system, communication bandwidth between the source and target storage systems may be conserved, and the time it takes to replicate the LSE may be reduced.

Illustrative embodiments of the invention will now be described in more detail in relation to the figures.

Figure 1:
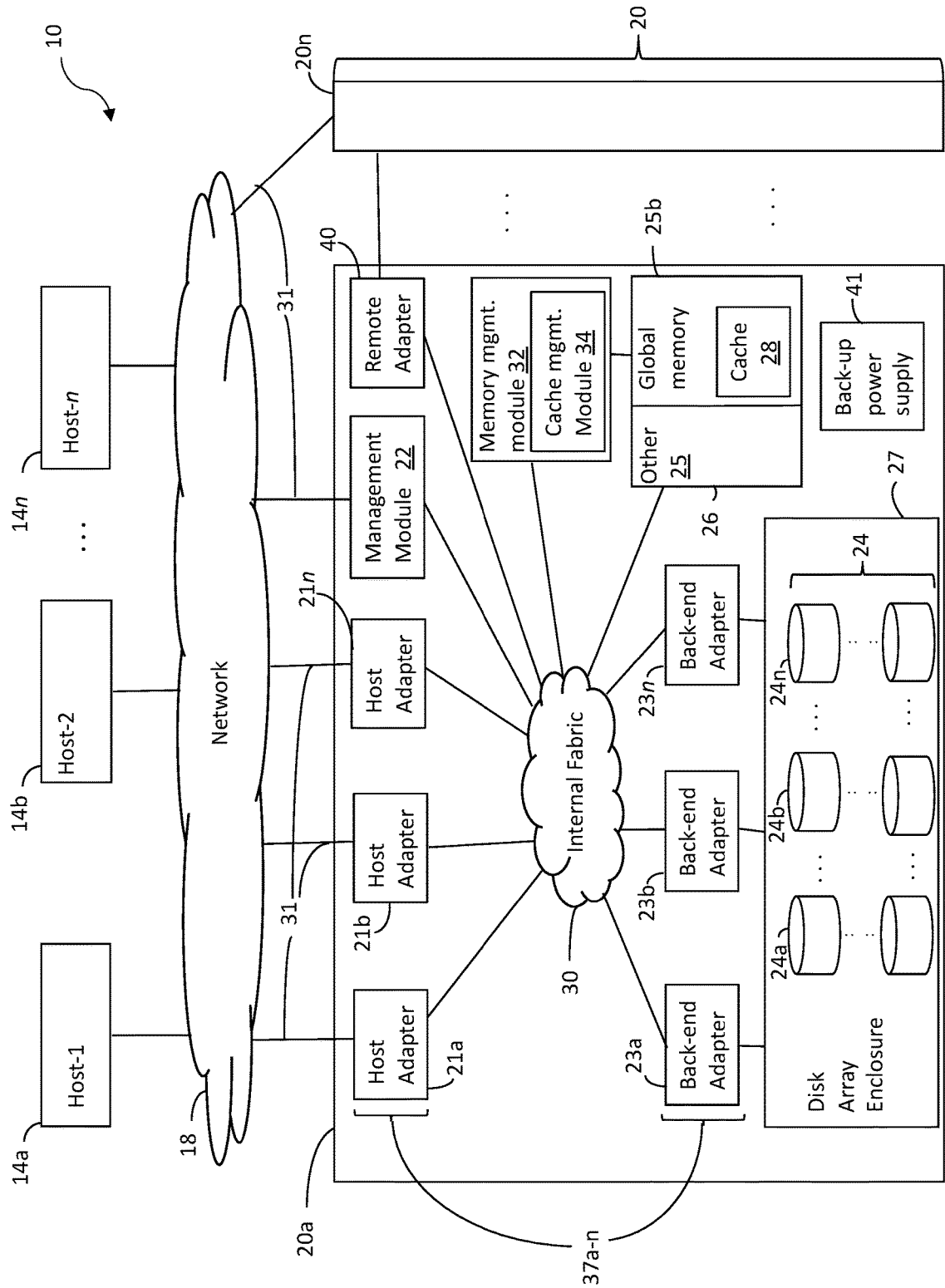
FIG. 1 is a block diagram illustrating an example of a data storage network, according to embodiments of the invention.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more 10 requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14*a-n*) may be notified that the write operation has completed. At a later time, the write data may be de-staged from cache 28 to one or more physical storage devices 24*a-n*, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof— e.g., the cache 28 or a portion thereof) may be configured such that each data written to the memory 28 is mirrored to provide a form of write protection. For example, each memory location within each such mirrored portion of the memory 26 may have a corresponding memory location on the storage system 20*a* to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20*a* may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20*a* (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20*a* may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
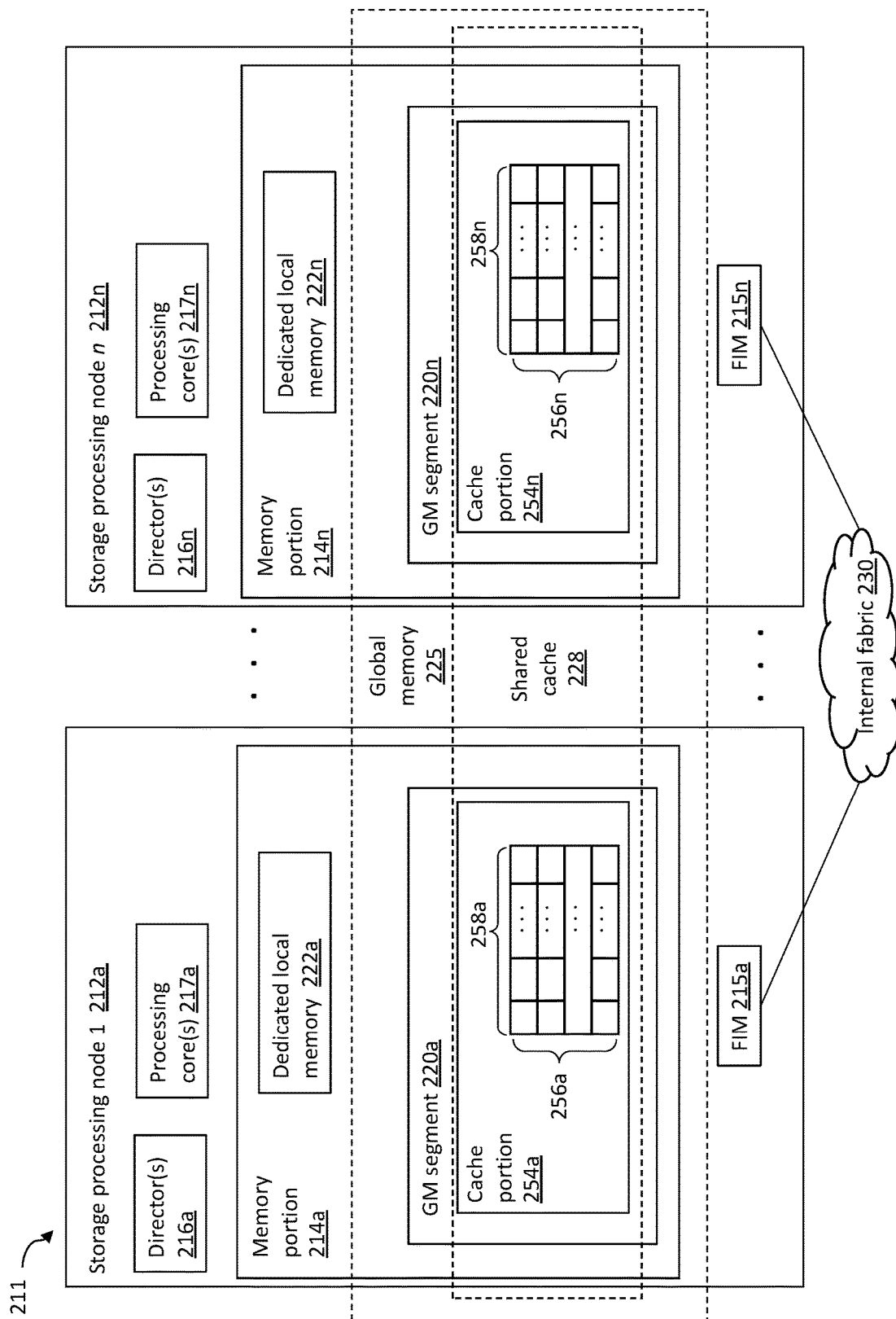
FIG. 2 is a block diagram illustrating an example of a storage system including multiple physically discrete storage processing nodes, according to embodiments of the invention.

Any of storage systems 20*a-n*, or one or more components thereof, described in relation to FIGS. 1-2 may be implemented using one or more Symmetrix™, VMAX™, VMAX™ or PowerMax™ systems made available from Dell EMC.

Host systems 14*a-n* may provide data and control (e.g., management and access control) information to storage systems 20*a-n* over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20*a*) including multiple, physically discrete storage processing nodes (e.g., circuit boards) 212*a*-212*n*, which may be referred to herein as "processing nodes." Storage system 211 may include a plurality of processing nodes 212*a*-212*n* and a fabric 230 (e.g., internal fabric 30) over which the processing nodes 212*a-n* may communicate. Each of the processing nodes 212*a*-212*n* may include components thereon as illustrated. The fabric 230 may include, for example, one or more switches and connections between the switch(es) and processing nodes 212*a*-212*n*. In at least one embodiment, the fabric 230 may be an IB fabric. In some embodiments, multiple processing 212*a-n* nodes may be implemented on a single physically discrete component; e.g., two processing nodes 212*a-n* may be implemented on single engine of PowerMax storage system.

In the following paragraphs, further details are described with reference to processing node 212*a* but each of the N processing nodes in a system may be similarly configured. For example, processing node 212*a* may include any of: one or more directors 216*a* (e.g., directors 37*a-n*); memory portion 214*a*; one or more processing cores 217*a* including compute resources, for example, as part of a CPUs and/or a CPU complex for processing IO operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store 10 data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process 10 on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
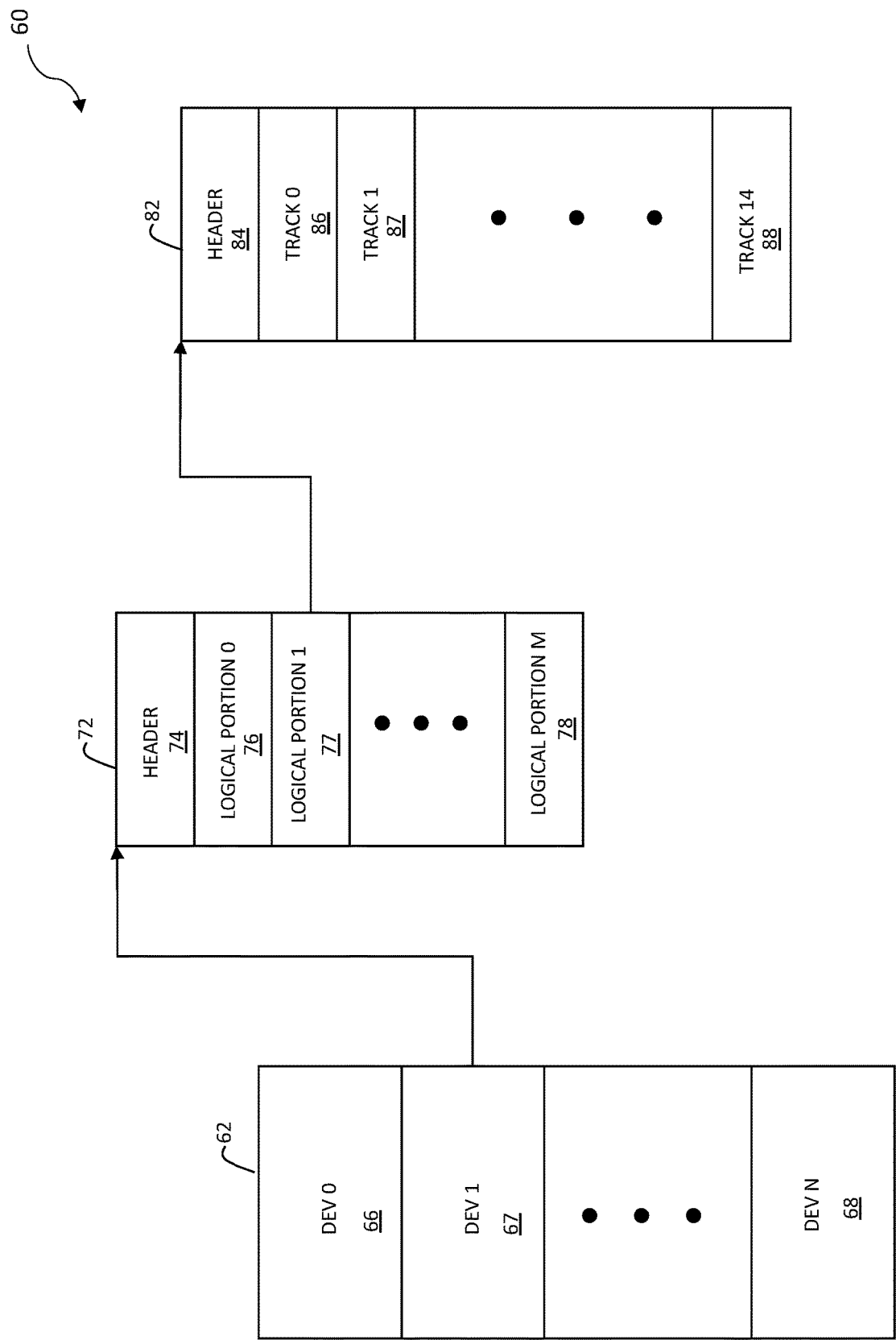
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

Figures 3B, 3C:
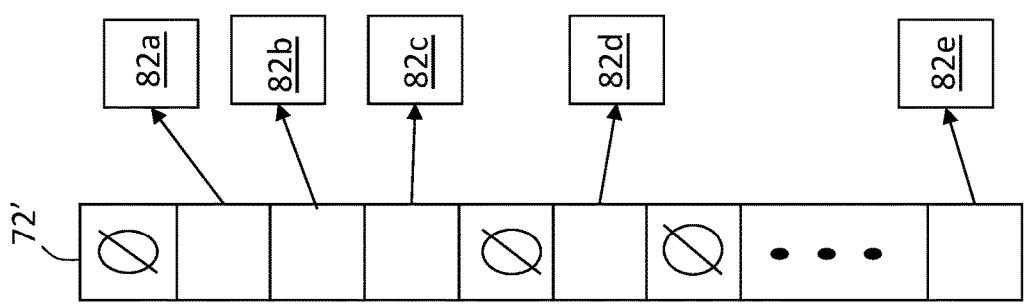
FIG. 3B is a block diagram illustrating an example of a table used for a thin logical device, according to embodiments of the invention.
FIG. 3C is a block diagram illustrating an example of a data structure for mapping logical storage unit tracks to cache slots, according to embodiments of the invention.

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 3C is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an IO operation can be mapped to one or more cache slots. Further, using the same data structures, the one or more physical address ranges corresponding to the one or more LSU tracks of the LSU may be mapped to one or more cache slots.

Storage systems (e.g., the storage system 20a) also may maintain data structures (e.g., masking tables) that define IO connectivity in terms of LSUs, storage ports and host ports; i.e., which ports of a host system ("host ports"; e.g., SCSI initiators) are permitted to perform IO communications with which LSUs (e.g., identified with, and sometimes referred to as, a Logical Unit Numbers (LUNs)) over which ports of a storage system ("storage ports" e.g., SCSI targets). Defining (including initially defining and later modifying) which host ports are permitted to perform IO communications with which LSUs over which storage ports, for example, using a masking table or other data structure, may be referred to as configuring or defining IO connectivity between a host port, storage port and LSU, or more simply as "masking."

The tables 62, 72, 72', 82 and 300 of FIGS. 3A-3C may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 300. Other data structures may be stored in any of GM 25b, memory 25a, GM segment 220a-n and/or dedicated local memories 22a-n.

FIG. 4 is a block diagram illustrating a system, for example, a storage system 401, for replicating duplicated data, according to embodiments of the invention. Other embodiments of a system for replicating duplicated data, for example, variations of the storage system, are possible and are intended to fall within the scope of the invention. The storage system 401 may be a variation of the storage system 20a described in more detail herein, and may include any of the components thereof and/or implement any of the functionality thereof.

The storage system 401 may include any of: LSUs 402, a deduplication data structure 430 and replication deduplication logic 410. The replication deduplication logic 410 may include executable logic, embodied in hardware, firmware and software, or any suitable combination thereof, for implementing functionality described herein in relation to deduplicating replicated data. The replication deduplication logic 410 may be included within, executed by and/or initiated by a director (e.g., 37a-n) of the storage system 401.

The deduplication data structure 430 may be any of a variety of data structures for maintaining deduplicated data, for example, a hash table including a plurality of entries 431. Each entry 431 may include: a hash of a data value (often referred to herein as a "fingerprint") in fingerprint column 432; and a direct or indirect reference to a location at which the data corresponding to the fingerprint is stored in location column 433. A direct reference may be to a location on a physical storage device (e.g., specified by a physical storage device identifier and an LBA range), whereas an indirect reference may be to another LSU metadata structure, e.g., an LSU track table or the like corresponding to one of the LSEs having a data value corresponding to the fingerprint.

A fingerprint of data may serve as an identifier of the data having a fixed size that is less than the size of the data itself, desirably much less in size. A fingerprint may be generated by applying a hash function to the data, for example, Message Digest 5 (MD5), Secure Hash Algorithm 1 (SHA-1), SHA-2 or SHA-256, etc., to produce a hash value or digest of the data. This hash value then may be stored in an entry 431 of the deduplication data structure 430, for example, in volatile memory of the storage system 401. This hash value then may be compared to future hash values generated from data (e.g., being copied or written) to determine whether there is a match, in which case, rather than storing the data from which the hash value was generated to a physical storage device, a reference (e.g., pointer) to the hash entry in the hash table may be maintained in one or more metadata structures, for example, an entry in an LSU track table corresponding to the LSE defining the data.

The granularity at which data is deduplicated—i.e., the size of the data to be fingerprinted and compared—can vary. The more granular the deduplication, the greater the likelihood of a match (i.e., a collision), and thus the greater the reduction of data stored to disk. However, as the granularity of duplication increases, so does the number of fingerprints that must be stored in non-volatile memory, and the number of fingerprints that must be generated and compared, consuming more system resources. Considering that some of today's larger storage systems can store up to several petabytes (PB) of data, where 1 PB=$10^{15}$ bytes, the amount of system resources that are consumed for deduplication can be considerable. For example, in an 8 PB system, if the granularity of deduplication is 128 KB—i.e., fingerprints are generated for 128 KB portions of data, the potential number of fingerprints is 8 billion.

In embodiments of the invention described herein, the granularity of deduplication is 128 KB, corresponding to a size of data represented by an LSE (e.g., a track). Other granularities of deduplication may be employed, which may correspond to other data sizes represented by LSEs.

In addition to a fingerprint (i.e., hash value) and location, each entry 431 also may include other information, including, for example, LSE identifiers for each LSE that has a data value represented by the fingerprint. For example, each entry may include or reference a linked list 434 of LSE identifiers of LSEs that have a data value represented by the fingerprint. These LSE identifiers may be used to determine a deduplication relationship between LSEs.

An LSU 402 (e.g., 402a) may include, for example, remote replication information 404, local replication information 406, a plurality of LSEs 408 and other information. The remote replication information 404 may specify a variety of information concerning remote replication involving the LSU 402a. For example, the remote replication information 404 may include an identifier of an LSU on the target storage system with which the LSU 402a has a replication relationship—i.e., to which the LSU 402a is replicated. The local replication information 406 may specify a variety of information concerning local replication involving the LSU 402a. The LSU 402a may be locally replicated to one or more other LSUs (e.g., 402b and/or 402n) on the storage system 401 using any of a variety of known technologies, for example, snapshot technology, e.g., Timefinder™ SnapVX™ technology made available from Dell EMC. The local replication information may include, for example, an identifier of another LSU on the storage system 401 that is a local replication of the LSU 402a. The local replication information may include references (e.g., pointers) to local replication (e.g., snapshot) metadata (not shown) for the LSU 402a.

FIG. 5 is a block diagram illustrating a LSE 508 for replicating duplicated data, according to embodiments of the invention. Other embodiments of a logical storage element for replicating duplicated data, for example, variations of the LSE 508, are possible and are intended to fall within the scope of the invention.

The LSE 508 (e.g., any of 408a-n) may include any of: remote replication information 504; local replication information 506, deduplication information 507 and other information. The remote replication information 504 may specify a variety of information concerning remote replication involving the LSE 508, including, for example, an identifier of an LSE of an LSU on the target storage system with which the LSE 508 has a replication relationship—i.e., to which the LSE 508 is replicated. The local replication information 506 may specify a variety of information concerning local replication involving the LSE 508, for example, an identifier of another LSE (and LSU of which it is a member) on the storage system 401 that is a local replication of the LSE 508, and a reference (e.g., pointer) to local replication (e.g., snapshot) metadata (not shown) for the LSE 508.

The deduplication information 507 may include any of a variety of information about deduplication of the LSE 508. For example, such information may include a reference (e.g., pointer) to an entry in the deduplication data structure 430 that represents a fingerprint (e.g., hash value) of the data portion of the LSE 508. For example, referring back to FIG. 4, each of LSEs 408a and 408n point to one of the entries 431 of the deduplication data structure 430, as illustrated. Further, LSEs (not shown) of the LSUs 402b and 402n also may point to one of the entries 431 of the deduplication data structure 430, as illustrated. As described, each entry 431 may include a direct or indirect reference to a storage location (e.g., on a physical storage device 24) of the data portion, such that the storage location of a deduplicated data portion of an LSE may be determined from accessing the entry 431 specified in the deduplication information 507 for the LSE.

The deduplication information 507 also may include an identification of one or more other LSEs on the storage system that represent data portions having the same value as the data portion represented by the LSE 508—i.e., that have the same deduplicated data value. In addition to, or as an alternative to, relying on the deduplication information 507 to determine one or more other LSEs on the storage system that have the same deduplicated data value, such information may be determined from the entry 431 referenced by the deduplication information 507.

It should be appreciated that a duplicate of the data portion defined by the LSE 508 may be determined from the local replication information 506 and/or the deduplication information 507. While the metadata structures used for local replication and deduplication may be separate and distinct, in some embodiments these data structures may be integrated.

FIG. 6 is a flowchart illustrating a method 600 of replicating duplicated data, according to embodiments of the invention. Other embodiments of a method of replicating duplicated data, for example, variations of the method 600, are possible and are intended to fall within the scope of the invention. The method 600 may be implemented by replication deduplication logic 410

In a step 601, a remote replication relationship may be established between a first LSU (L1) on a first (source) storage system and a second LSU (L1') on a second (target) storage system such that data on L1 is replicated on L1'. That is, each storage system may be configured to perform the replication, which may include an exchange of communications between L1 and L1' using a remote adapter (e.g., RA 40) on each storage system.

In a step 602, it may be determined to replicate an LSE (E1) of L1, for example, in response to a write operation or copy command (e.g., extended copy (XCopy) or ODX defined in accordance with an SCSI protocol) including E1, which may be received from a host system. A write operation or copy command may include E1 if it specifies E1 itself or it specifies L1 or another LSE of L1 that includes E1. E1 represents a data portion having a value. In some embodiments, a storage system (source or target) may be configured such that, if a copy command is executed on the storage system, a deduplication relationship is automatically established between each LSE whose data portion is being copied as part of the copy command and its corresponding LSE to which the data portion is being copied.

In a step 606, it may be determined whether another LSE on the target system for L1 (i.e., the target system on which L1' resides) represents a data portion having a same value as the data portion represented by L1, for example, as described in more detail elsewhere herein. If it is determined that another LSE on the target system represents a data portion having a same value as the data portion represented by L1, then in a step 607 a communication may be sent from the source storage system to the target storage system to establish a deduplication relationship on the target system between the LSE (E1') with which E1 has a replication relationship on the target system and the LSE (E2') on the target system determined in the step 606. In some embodiments, a communication that explicitly instructs E1' to establish the deduplication relationship between E1' and E2' may be sent. Alternatively, in embodiments in which the target storage system is configured to automatically establish a deduplication relationship if a copy command is executed on the target storage system, as described in more detail elsewhere herein, a copy command (e.g., XCopy or ODX) specifying to copy E2' to E1' may be sent from the source storage system to the target storage system.

In a step 608, in response to receiving the communication sent in the step 607, a deduplication relationship may be established on the target system between E1' and E2' on the target system. For example, the deduplication information (e.g., 507) of E1' and E2' may be updated to point to a same entry (e.g., 431) in a deduplication data structure (e.g., 430) and/or to reference each other. By establishing the deduplication relationship, E1 may be effectively replicated to E1' on the target system without having to send a copy of the data portion from the source storage system to the target storage system.

If it is determined in the step 606 that there is not another LSE on the target system, then in a step 608 the data portion of E1 may be transmitted from the source storage system to the target storage system, for example, according to normal replication processing.

In a case where a copy command or write operation specifying an LSU or LSE including multiple LSEs triggers the performance of the step 602, the steps 606-610 may be performed for each LSE included in the LSU or LSE that triggered the performance.

FIG. 7 is a block diagram illustrating a method 700 of determining whether an LSE on a target storage system has a same data value as an LSE on a source storage system, according to embodiments of the invention. Other embodiments of a method of determining whether an LSE on a target storage system has a same data value as an LSE on a source storage system, for example, variations of the method 700, are possible and are intended to fall within the scope of the invention. The method 700 may be implemented as part of performing the step 606 of the method 600. The method 700 may be implemented by replication deduplication logic 410.

In a step 702, it may be determined whether there are any LSEs on the source LSE having the same data value as E1. Such a determination may be made, for example, by consulting the local replication information 506 or deduplication information 507 of the LSE. For example, if the LSE is a member of an LSU that is a snapshot target of another LSU, the local replication info should indicate the snapshot relationship and specify an identity of the source LSU of the snapshot or include a reference a metadata structure that references the source LSU.

If the source storage system is configured to automatically establish deduplication relationships in response to copy commands, and the method 600 (including the method 700) is executed in response to a copy operation, deduplication information 507 of the LSE should indicate a deduplication relationship with the corresponding LSE from which data was copied to E1. If method 600 (including the method 700) is executed in response to a write operation or copy operation (e.g., and the source storage system is not configured to automatically establish deduplication relationships in response to copy commands), a fingerprint (e.g., hash value) of the data being written may be generated and compared against entries of a deduplication data structure (e.g., 430) to determine if there is duplicate data portion on the source storage system.

If it is determined in the step 702 that there are not one or more LSEs on the source LSE having the same data value as E1, then the method 700 may end. Otherwise, the method 700 may loop through performance of steps 704-714 until it is determined that that there is an LSE on a target storage system that has a same data value as an LSE on a source storage system or all of the one or more LSEs on the source LSE having the same data value have been considered. In a step 704, it may be determined if there is a next of the one or more LSEs determined in the step 702. On a first pass through the step 704, the answer is yes.

If it is determined in the step 704 that there is not a next of the one or more LSEs determined in the step 702; i.e., all of the one or more LSEs have been considered, then the method 700 may end. Otherwise, in a step 706 it may be determined whether the current LSE (determined in the step 704) being considered is replicated on the target storage system, and if so, in a step 708 the LSE on the target system to which the current LSE is replicated may be determined. The determinations made in the steps 706 and 708 may be made from examination of the remote replication information 504 of the current LSE and/or the remote replication information 404 of the LSU of which the LSE is a member. For example, the remote replication information of the LSU and/or LSE may define a replication relationship with an LSU and/or LSE, respectively, of the target system. If it is determined in the step 706 that the current LSE is not replicated on the target storage system, then the method 700 may return to the step 704 to consider the next determined LSE.

In a step 710 it may be determined whether there is a write pending for the current LSE. For example, if the source storage system is configured such that write operations are staged in cache before being de-staged to a physical storage device, it may be determined whether there is a write operation for the LSE that is currently staged in cache waiting to be de-staged to a physical storage device. If so, then it may not be desirable to establish a deduplication relationship with the replicated data on the target system as the data on the corresponding LSE on the target system is not currently synchronized with the current LSE, and the method 700 may return to the step 704. Otherwise, the method 700 may proceed to a step 712 where it may be determined whether the data portion of the LSE is invalid for any reason, in which case the method may proceed to the step 704. Otherwise, it may be concluded in a step 714 that the value of the data portion for the current LSE, which has a same value as E1, is properly replicated to an LSE (E2') on the target system. Accordingly, it may be concluded that E2' represents a data portion on the target storage system having the same value as the data portion represented by E1 on the source storage system.

Figure 8A:
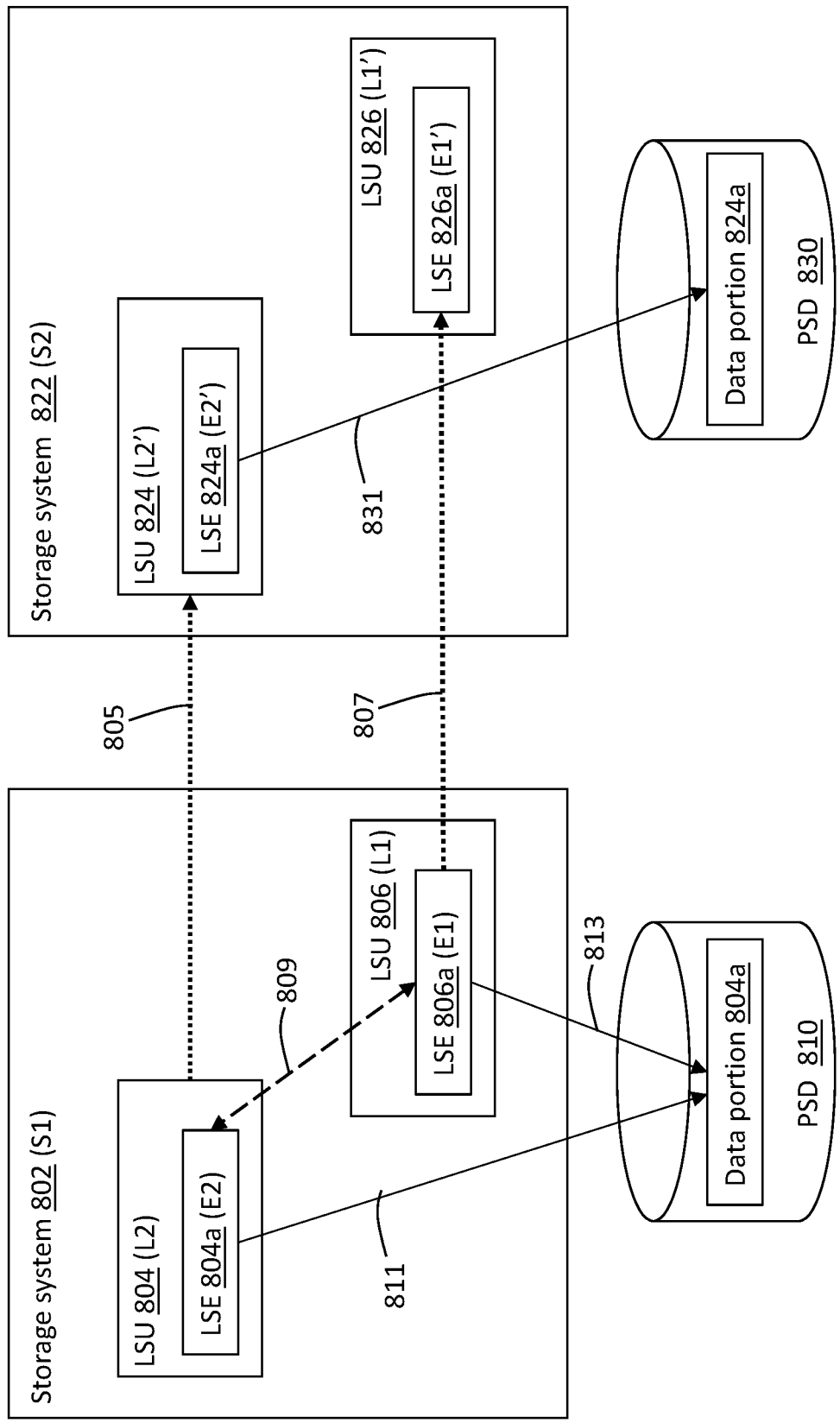
FIGS. 8A and 8B illustrate an example of replicating duplicated data on a target system, according to embodiments of the invention.
Figure 8B:
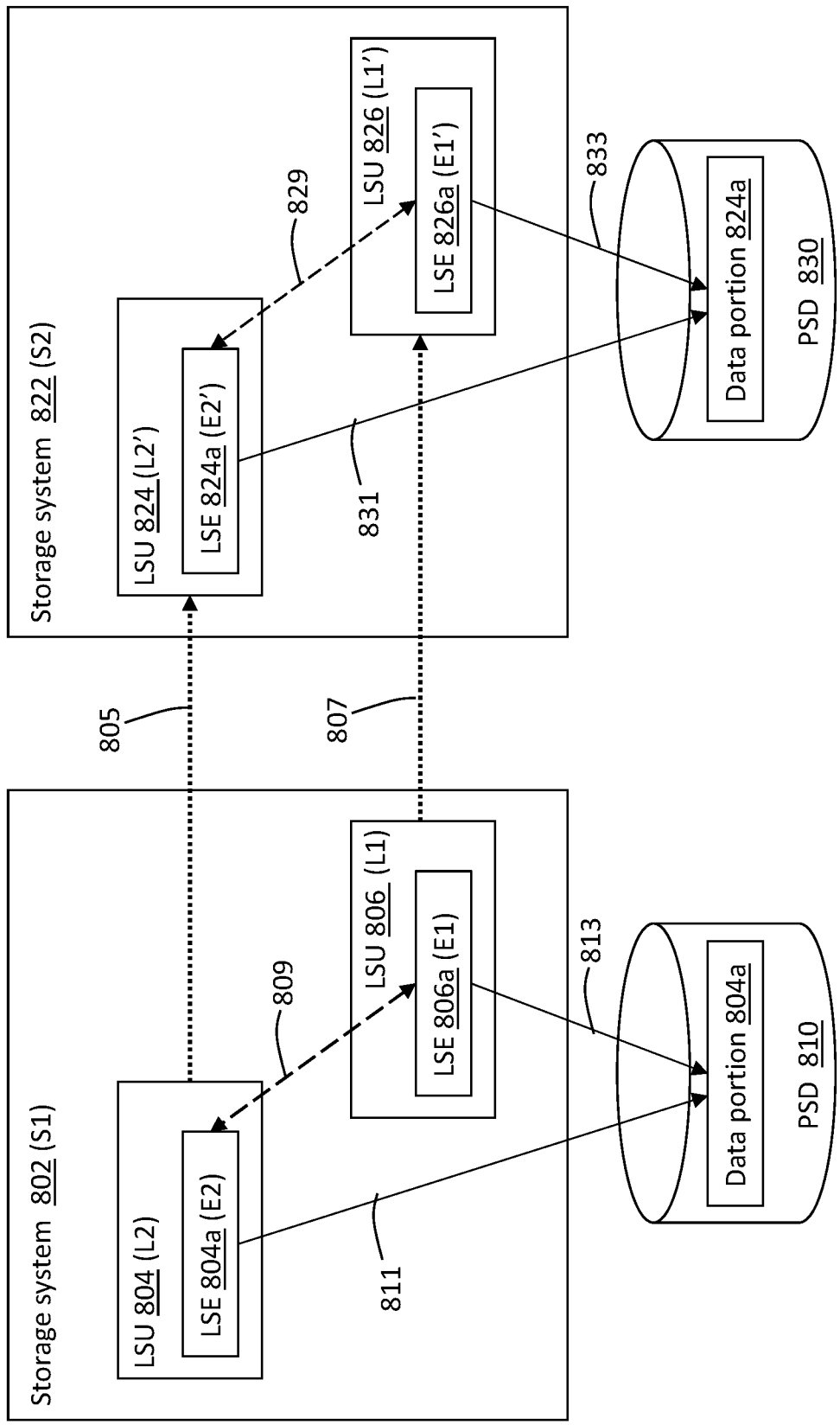

FIGS. 8A and 8B illustrate an example of replicating duplicated data on a target system, according to embodiments of the invention. FIG. 8A may represent a state of a system (e.g., a data storage network) including a first (source) storage system 802 and a second (target) storage system 822 after performance of the step 601 of the method 600, but before performance of the remaining steps of the method 600. A first LSE 806a (E1) of a first LSU 806 (L1) of the source storage system 802 (S1) has a remote replication relationship (indicated by dotted line 807) with a second LSE 826a (E1') of a second LSU 826 (L1') of the target storage system 822 (S2). A third LSE 804a (E2) of a third LSU 804 (L2) of S1 has a remote replication relationship (indicated by dotted line 805) with a fourth LSE 824a (E2') of a fourth LSU 824 (L2') of S2. E2 has a deduplication relationship with E1 (as indicated by dashed line 809), where each ultimately (e.g., directly or indirectly) point to a same data portion 804a on physical storage device (PSD) 810, as reflected by solid lines 811 and 813. E2' ultimately (e.g., directly or indirectly) points to a data portion 824a on physical storage device (PSD) 830, as reflected by solid line 831. In FIG. 8B, no deduplication relationship has yet been established between E1' and E2'.

FIG. 8B may represent a state of the system after performance of the steps 602-610 on the system in its state illustrated in FIG. 8A. In response to receiving a write operation or copy command on S1 that includes E1, it may be determined (e.g., the step 602) to replicate E1 to E1'. It may be determined (e.g., from performance of the step 606 and/or the method 700) that E2' represents a data portion 824a having the same value as the data portion 804a represented by E1. S1 may send a communication to S2 (e.g., the step 607) to establish a deduplication relationship between E1' and E2', in response to which a deduplication relationship (indicated by dashed line 829) may be established between E1' and E2' (e.g., the step 608) resulting in E1' ultimately pointing (directly or indirectly) to the data portion 824a (as illustrated by dotted line 833).

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 600 and 700, or parts thereof, may be implemented using one or more of the systems and/or data structures described in relation to FIGS. 1-5, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, any suitable combination thereof.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of replicating data from a source storage system to a target storage system, comprising:
   determining to replicate a first logical storage element on the source storage system to a second logical storage element on the target storage system, wherein the first logical storage element defines a first data portion having a first value, wherein the source storage system is a first standalone system and the target storage system is a second standalone system physically separate from the source storage system;
   determining that a fourth logical storage element on the source storage system defines a third data portion having the first value, wherein a deduplication relationship exists between the fourth logical storage element and the first logical storage element;
   determining that the fourth logical storage element defining the third data portion with the first value has been replicated from the source storage system to the target storage system;
   responsive to determining that the fourth logical storage element defining the third data portion with the first value has been replicated from the source storage system to the target storage system, determining that the fourth logical storage element of the source storage system is configured for replication to a third logical storage element on the target storage system, wherein the third storage element of the target storage system defines a second data portion having the first value; and
   replicating the first logical storage element to the second logical storage element by establishing a deduplication relationship between the second logical storage element and the third logical storage element on the target storage system without transmitting the first data portion from the source storage system to the target storage system.

2. The method of claim 1, further comprising:
   sending a communication to the target storage system that specifies to the target storage system to establish the deduplication relationship between the second logical storage element and the third logical storage element, wherein the deduplication relationship between the second logical storage element and the third logical storage element is established in response to the communication.

3. The method of claim 1, further comprising:
   sending a communication to the target storage system that specifies that the target storage system copy the third logical storage element to the second logical storage element,
   wherein the deduplication relationship between the second logical storage element and the third logical storage element is established in response to the communication.

4. The method of claim 3, wherein establishing the deduplication relationship between the second logical storage element and the third logical storage element includes:
   in response to receiving the communication, executing a copy command on the third logical storage element in accordance with a SCSI protocol,
   wherein the target system is configured to establish deduplication relationships in response to executing the copy command.

5. The method of claim 1, wherein establishing the deduplication relationship between the second logical storage element and the third logical storage element results in the second logical storage element including a pointer to a physical storage location or metadata structure corresponding to the second logical storage element.

6. The method of claim 1, wherein a replication relationship is defined between a first logical storage unit on the source storage system that includes the first logical storage element and a second logical storage unit on the target storage system that includes the second logical storage element,
   and wherein the determination to replicate in accordance with the replication relationship is made in response to receiving a copy instruction that causes copying the fourth logical storage element to the first logical storage element and establishing of the deduplication relationship between the fourth logical storage element and the first logical storage element.

7. The method of claim 1, wherein a replication relationship is defined between a first logical storage unit on the source storage system that includes the first logical storage element and a second logical storage unit on the target storage system that includes the second logical storage element,
   wherein the determination to replicate in accordance with the replication relationship is made in response to receiving a write operation specifying the first logical storage element and the first data portion, and
   wherein establishing the deduplication relationship between the fourth logical storage element and the first logical storage element includes determining that the first data portion defined by the first logical storage element and the third data portion defined by the fourth logical storage element have a same value.

8. The method of claim 1, wherein the fourth logical storage element is a member of a first logical storage unit on the source target system, and the third logical storage element is a member of a second logical storage unit on the target system, and
   wherein determining that the fourth logical element is configured for replication to the third logical storage element includes determining a replication relationship between the first logical storage unit and the second logical storage unit.

9. A system for replicating data, comprising:
   a source storage system including a first logical storage element;
   a target storage system including a second logical storage element, wherein the source storage system is a first standalone system and the target storage system is a second standalone system physically separate from the source storage system; and
   executable logic that implements a method including:
   determining to replicate a first logical storage element on the source storage system to a second logical storage element on the target storage system, wherein the first logical storage element defines a first data portion having a first value, wherein the source storage system is a first standalone system and the target storage system is a second standalone system physically separate from the source storage system;
   determining that a fourth logical storage element on the source storage system defines a third data portion having the first value, wherein a deduplication relationship exists between the fourth logical storage element and the first logical storage element;

determining that the fourth logical storage element defining the third data portion with the first value has been replicated from the source storage system to the target storage system;

responsive to determining that the fourth logical storage element defining the third data portion with the first value has been replicated from the source storage system to the target storage system, determining that the fourth logical storage element of the source storage system is configured for replication to a third logical storage element on the target storage system, wherein the third storage element of the target storage system defines a second data portion having the first value; and replicating the first logical storage element to the second logical storage element by establishing a deduplication relationship between the second logical storage element and the third logical storage element on the target storage system without transmitting the first data portion from the source storage system to the target storage system.

10. The system of claim 9, wherein the method further includes:

sending a communication to the target storage system that specifies to the target storage system to establish the deduplication relationship between the second logical storage element and the third logical storage element, wherein the deduplication relationship between the second logical storage element and the third logical storage element is established in response to the communication.

11. The system of claim 9, wherein the method further includes:

sending a communication to the target storage system that specifies that the target storage system copy the third logical storage element to the second logical storage element, wherein the deduplication relationship between the second logical storage element and the third logical storage element is established in response to the communication.

12. The system of claim 11, wherein establishing the deduplication relationship between the second logical storage element and the third logical storage element includes:

in response to receiving the communication, executing a copy command on the third logical storage element in accordance with a SCSI protocol, wherein the target system is configured to establish deduplication relationships in response to executing the copy command.

13. The system of claim 9, wherein a replication relationship is defined between a first logical storage unit on the source storage system that includes the first logical storage element and a second logical storage unit on the target storage system that includes the second logical storage element, and wherein the determination to replicate in accordance with the replication relationship is made in response to receiving a copy instruction that causes copying the fourth logical storage element to the first logical storage element and establishing of the deduplication relationship between the fourth logical storage element and the first logical storage element.

14. The system of claim 9, wherein a replication relationship is defined between a first logical storage unit on the source storage system that includes the first logical storage element and a second logical storage unit on the target storage system that includes the second logical storage element, wherein the determination to replicate in accordance with the replication relationship is made in response to receiving a write operation specifying the first logical storage element and the first data portion, and wherein establishing the deduplication relationship between the fourth logical storage element and the first logical storage element includes determining that the first data portion defined by the first logical storage element and the third data portion defined by the fourth logical storage element have a same value.

15. The system of claim 9, wherein the fourth logical storage element is a member of a first logical storage unit on the source target system, and the third logical storage element is a member of a second logical storage unit on the target system, and wherein determining that the fourth logical element is configured for replication to the third logical storage element includes determining a replication relationship between the first logical storage unit and the second logical storage unit.

16. One or more non-transitory computer-readable media having code stored thereon that, when executed, performs a method of replicating data from a source storage system to a target storage system, the method comprising:

determining to replicate a first logical storage element on the source storage system to a second logical storage element on the target storage system, wherein the first logical storage element defines a first data portion having a first value, wherein the source storage system is a first standalone system and the target storage system is a second standalone system physically separate from the source storage system;

determining that a fourth logical storage element on the source storage system defines a third data portion having the first value, wherein a deduplication relationship exists between the fourth logical storage element and the first logical storage element;

determining that the fourth logical storage element defining the third data portion with the first value has been replicated from the source storage system to the target storage system;

responsive to determining that the fourth logical storage element defining the third data portion with the first value has been replicated from the source storage system to the target storage system, determining that the fourth logical storage element of the source storage system is configured for replication to a third logical storage element on the target storage system, wherein the third storage element of the target storage system defines a second data portion having the first value; and replicating the first logical storage element to the second logical storage element by establishing a deduplication relationship between the second logical storage element and the third logical storage element on the target storage system without transmitting the first data portion from the source storage system to the target storage system.

* * * * *